(12) United States Patent
Araki et al.

(10) Patent No.: US 7,447,561 B2
(45) Date of Patent: Nov. 4, 2008

(54) DISPLAY APPARATUS FOR INJECTION MOLDING MACHINE

(75) Inventors: Kenji Araki, Yamanashi (JP); Osamu Saito, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/404,856

(22) Filed: Apr. 17, 2006

(65) Prior Publication Data

US 2006/0235567 A1 Oct. 19, 2006

(30) Foreign Application Priority Data

Apr. 18, 2005 (JP) ............................. 2005-120004

(51) Int. Cl.
*B29C 45/00* (2006.01)
(52) U.S. Cl. ........................................ 700/200; 700/83
(58) Field of Classification Search ......... 700/200–205; 264/40.1
See application file for complete search history.

(56) References Cited

U.S. PATENT DOCUMENTS

| | | | | |
|---|---|---|---|---|
| 5,005,116 | A * | 4/1991 | Fujita et al. | 700/83 |
| 6,325,954 | B1 * | 12/2001 | Sasaki et al. | 264/40.1 |
| 6,931,300 | B2 * | 8/2005 | Yamazaki et al. | 700/200 |
| 2004/0088066 | A1 * | 5/2004 | Yamazaki et al. | 700/95 |
| 2004/0186607 | A1 * | 9/2004 | Yoshinaga et al. | 700/109 |

FOREIGN PATENT DOCUMENTS

| | | |
|---|---|---|
| JP | 63-196928 | 8/1988 |
| JP | 05-162180 | 6/1993 |
| JP | 06-089121 | 3/1994 |
| JP | 06-114907 | 4/1994 |
| JP | 8-156060 | 6/1996 |
| JP | 08-323833 | 12/1996 |
| JP | 2002-307513 | 10/2002 |
| JP | 2003-97983 | 4/2003 |
| JP | 2004-155086 | 6/2004 |
| JP | 2004-155087 | 6/2004 |

OTHER PUBLICATIONS

JP 2004-155086, Osamu, Translation, pp. 1-7.*
European Search Report dated Aug. 29, 2006, for related European Patent Application No. EP 06 00 8033.0-2307.
Notice of Reasons for Rejection (Office Action) in corresponding Japanese Patent Application No. 2005-120004, mailed Jul. 10, 2007.
Office Action issued in corresponding Japanese Patent Application No. 2005-120004, mailed on Oct. 16, 2007.

* cited by examiner

*Primary Examiner*—Zoila E Cabrera
(74) *Attorney, Agent, or Firm*—Staas & Halsey LLP

(57) ABSTRACT

A display apparatus for an injection molding machine which permits setting items unalterable during operation of the injection molding machine to be identified on the screen. When the injection molding machine is not in operation, the setting items on the screen are shown in a normal first display appearance. During operation of the machine, unalterable setting items, among the setting items on the screen, are shown in a second display appearance to be distinguished from the first display appearance. Since setting items that are normally alterable but should not be altered during operation of the injection molding machine are displayed in the second display appearance in a distinguishable manner, such setting items can be clearly identified, thus improving operability.

6 Claims, 5 Drawing Sheets

FIG. 3

| #22 MOLD MOVEMENT OPTIONS | | | | MOLD: 0001 | | 2005/ 4/ 1 18:06 |
|---|---|---|---|---|---|---|

AIR EJECTOR

| | START(MM) | DELAY (SEC) | OUTPUT (SEC) |
|---|---|---|---|
| AIR 1 (STA SIDE) | 0.00 | 0.0 | 0.0 |
| AIR 2 (NOZZLE) | 0.00 | 0.0 | 0.0 |
| AIR 3 (MOVABLE SIDE) | 0.00 | 0.0 | 0.0 |

PRESENT VALUES

| | |
|---|---|
| SCREW POSITION | 61.99 MM |
| CLAMP POSITION | 52.71 MM |
| EJECTOR POSITION | 27.00 MM |
| PRESSURE | 36 KG/CM2 |
| PEAK PRESSURE | 0 KG/CM2 |
| MIN. CUSHION | 0.00 MM |
| V-P POSITION | — MM |
| V-P PRESSURE | 0 KG/CM2 |
| MEASURING START | 0.00 MM |
| INJECTION TIME | 0.000 SEC |
| MEASURING TIME | 0.00 SEC |
| CYCLE TIME | 0.00 SEC |

| | STOP(MM) | CONFIRMATION | INPUT SIGNAL | TIMER (SEC) |
|---|---|---|---|---|
| CORE SEQUENCE | ON AFTER MOLD CLOSING | 264.00 | INPUT SIGNAL | 0.00 |
| CORE SET | ... | 0.00 | | |
| CORE PULL | ... BEFORE MOLD OPENING | | | |

{ A }

| | | MOLD CLOSING STOPPAGE TIME | MOLD CLOSING STOP POSITION | 59.71 MM |
|---|---|---|---|---|
| VACUUM DEVICE | OFF | 0.0 | | |
| TERMINATION OF SUCTION | TERMINATION OF PRESSURE HOLDING | SUCTION TIME 0.0 | SUCTION START POSITION | 59.71 MM |

| | | START POSITION | 59.71 MM |
|---|---|---|---|
| VALVE GATE | OFF | | |

| MOLD-MOVEMENT EJECTION | MOLD-MOVEMENT OPTIONS | AI MOLD PROTECTION | AI EJECTOR PROTECTION | MOLD-THICKNESS ADJUSTMENT |
|---|---|---|---|---|

SETTING RANGE:
PCK

DISPLAY APPARATUS FOR INJECTION MOLDING MACHINE

BACKGROUND OF THE INVENTION

1. Field of the Invention

The present invention relates to an injection molding machine, and more particularly to a display apparatus for the injection molding machine to display set data and molding states.

2. Description of Related Art

An injection molding machine requires a large number of molding conditions to be set for molding articles. When setting values for such numerous items of molding conditions, it is usually the case that various setting frames are displayed on the display device to allow values to be set with respect to the setting items displayed on the screen. It is also customary to detect a molded state and to cause the detected values of the respective setting items, indicative of the molded state, to be displayed on a screen of the display device.

Among such setting items, some items should preferably not be altered during the operation of the injection molding machine. In the case of performing molding operation with the use a mold having a core, for example, the core setting of the injection molding machine is set ON (core movement enabled) to allow the core of the mold to be moved (inserted or removed) in harmony with the operation of the injection molding machine so that the molding may be carried on while the movement of the core is checked.

If, however, the core setting is changed from ON (core movement enabled) to OFF (core movement disabled) during the operation of the injection molding machine, the core ceases to move in harmony with the operation of the injection molding machine, possibly causing defective molding or even damage to the mold.

Accordingly, measures have conventionally been taken to prohibit those setting items which should preferably not be altered during the operation of the injection molding machine from being changed during the operation of the machine.

In such conventional injection molding machines, if the operator tries to change the set value or set detail of a setting item that should not be altered during the operation of the machine, a message such as "Not Alterable During Operation" is displayed when the enter key is pressed following the entry of a value or the like, thus preventing the set value from being changed. Namely, the operator cannot judge by just viewing the display of the screen whether a certain setting item is alterable during operation or not. The operator is not notified that the setting item is unalterable during operation until the last stage of input operation, that is, until the message "Not Alterable During Operation" is displayed in response to the entry of a value or the like. Consequently, it is often the case that the operator tries to alter the setting items that are unalterable because the injection molding machine is in operation, which lowers operability.

A display apparatus for a molding machine is also known wherein input items and touch areas associated therewith are displayed on the display screen. With respect to those input items which do not require data entry because of set conditions, an indication showing that no data entry is required is displayed on the corresponding touch areas and also the touch contacts are logically released to prevent data entry (see JP 05-162180A).

Further, a key input device is known which is constituted by color liquid-crystal display means and transparent sheet switching input means placed thereon. When a certain mode is set, keys which can accept input data in the set mode and keys which are unable to accept input data in the set mode are displayed in different colors for easy distinction (see JP 63-196928A).

In the above conventional injection molding machine, the operator may possibly try to alter the setting items which are normally alterable but cannot be altered during the operation of the injection molding machine, and the message "Not Alterable During Operation" is not displayed until the enter key is depressed. It is therefore likely that the input operation is performed uselessly, which lowers operability.

In the display apparatus disclosed in JP 05-162180A, the indication showing that no data entry is required is displayed not depending on whether the injection molding machine is operating or not, but is displayed with respect to those items which need not be set because of other set conditions. The disclosed display apparatus is not adapted to display such an indication with respect to the items which should not be altered during the operation of the injection molding machine, and thus it is possible that the items will be mistakenly altered during operation.

The key input device disclosed in JP 63-196928A is adapted to display the input-enabled keys and the input-disabled keys in different colors, depending on the mode. Thus, the input-enabled keys and the input-disabled keys are merely color-coded, and the disclosed device is unable to indicate that certain setting items are unalterable during operation.

SUMMARY OF THE INVENTION

The present invention provides a display apparatus for an injection molding machine capable of confirming setting items that are unalterable during an operation of the injection molding machine on a display device.

A display apparatus of the present invention displays a plurality of setting items of the injection molding machine on a display device. The display apparatus comprises: controlling means for making one or more setting items in the plurality of setting items unalterable during an operation of the injection molding machine; and displaying means for displaying alterable setting items other than the one or more setting items that are made unalterable in a first display appearance, and displaying the one or more setting items that are made unalterable in a second display appearance different from the first display appearance on the display device during the operation of the injection molding machine.

The setting items may comprise set values or details, and the set values or details that are made unalterable may be displayed in the first display appearance different from the second display appearance of the other set values or details.

The setting items may comprise item names, and the item names that are made unalterable are displayed in the second display appearance different from the first display appearance of the other item names.

A controller of the injection molding machine may have the display device and may serve as the controlling means and the displaying control means.

The display apparatus may constitute an external display unit with the display device and an interface, and the external display unit may be connected to a controller of the injection molding machine through the interface.

The display apparatus may constitute an external display unit with the display device and an interface, and the external display unit may be connected to controllers of a plurality of injection molding machines through the interface, to display the plurality of setting items for any of the plurality of injection molding machines on the display device.

On the screen displayed during the operation of the injection molding machine, those setting items which are normally alterable but cannot be altered during the operation of the injection molding machine are displayed in the display appearance different from that of the alterable setting items. Since the unalterable setting items are displayed as such, the operator is prevented from uselessly trying to alter the unalterable setting items, thus improving operability.

BRIEF DESCRIPTION OF THE DRAWINGS

FIG. 3 exemplifies a screen displayed according to the first embodiment;

DETAILED DESCRIPTION

Figure 1:
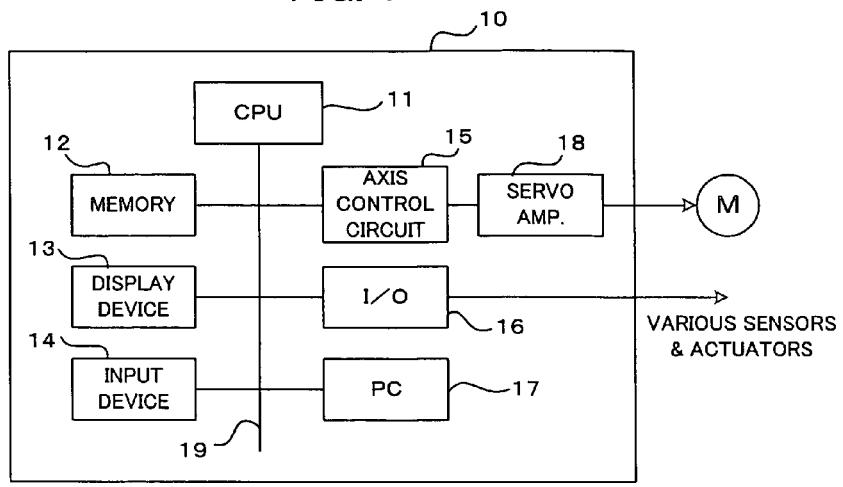
FIG. 1 is a block diagram showing a principal part of a first embodiment according to the present invention.

FIG. 1 is a block diagram showing a principal part of a display apparatus according to one embodiment of the present invention, and in this embodiment, the display apparatus is constituted by a numerical controller for controlling an injection molding machine.

The numerical controller, which is the controller for controlling the injection molding machine as well as the display apparatus according to the embodiment of the present invention, is identical in configuration with conventional numerical controllers for controlling injection molding machines and, therefore, is only schematically illustrated in the figure. The controller of the embodiment differs from the conventional controllers in that a memory stores software for displaying setting items on a screen of a display device along with information indicating whether the displayed setting items are alterable or not, and that the software is executed by the processor of the controller.

In FIG. 1, the controller 10, which constitutes the display apparatus, includes a processor 11. The processor is connected, via a bus 19, with a memory 12 such as ROM, RAM and nonvolatile RAM, a display device 13, an input device 14 such as a keyboard and a mouse, axis control circuits 15 for controlling servomotors for driving respective axes associated with the mold clamping mechanism, injection screw, etc. of the injection molding machine (in FIG. 1, a single axis control circuit and a servomotor associated therewith are shown), an input/output circuit 16, and a PC (programmable controller) 17 for performing sequence control of the injection molding machine. Also, the axis control circuit 15 is connected via a servo amplifier 18 with a servomotor M. Further, various sensors and actuators of the injection molding machine are connected to the input/output circuit 16. The bus 19 may be of any type, serial or parallel.

In accordance with a system program stored in the memory, the processor 11 controls the operation of the injection molding machine, such as measuring, mold-clamping, injection and pressure-holding, and also performs display control for displaying, on the display device 13, setting screens for various molding conditions, various screens showing the status of the injection molding machine, etc. The present invention is characterized in the control of display screens.

Figure 2:
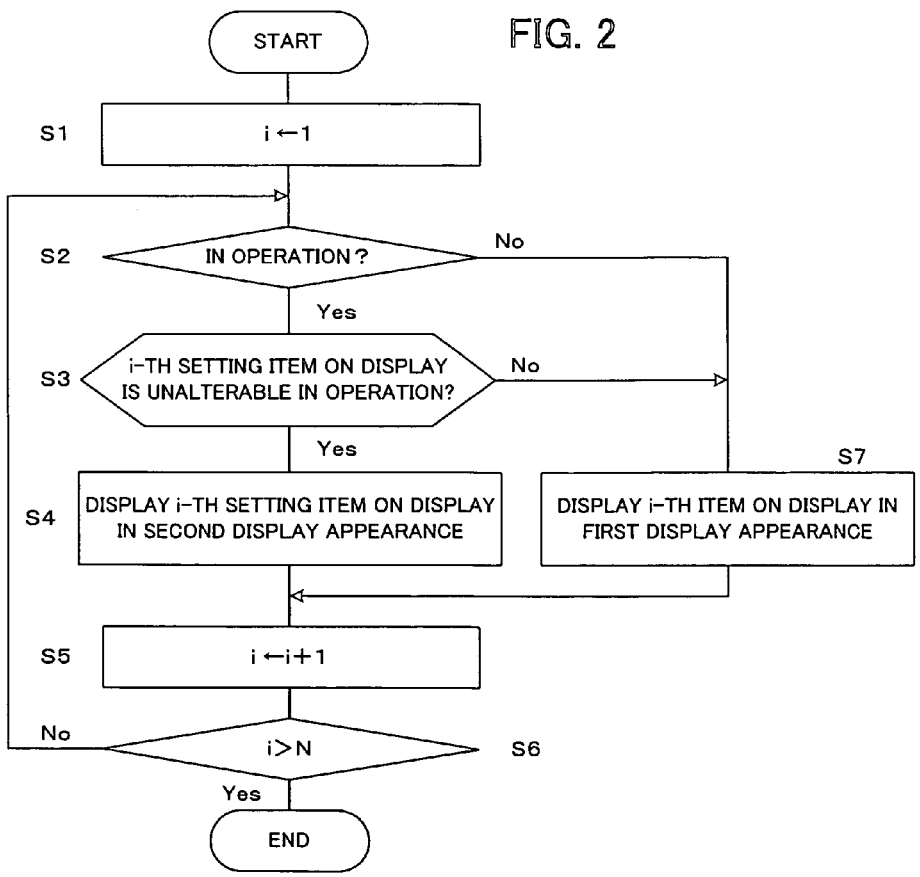
FIG. 2 is a flowchart illustrating a setting item display control process executed in the first embodiment.

FIG. 2 is a flowchart illustrating a setting item display control process executed by the processor 11 in accordance with the present invention when a setting screen to be displayed on the display device 13 is selected by the operator through operation of the input device 14. While the setting screen is displayed, the process shown in the flowchart is executed at predetermined intervals of time.

The memory 12 stores in advance information indicating, with respect to each of setting items displayed on the setting screen, whether or not the setting item can be altered during the operation of the injection molding machine. In this embodiment, setting items that cannot be altered during the operation of the injection molding machine are stored as unalterable items.

When the display screen is switched to the setting screen by the operator, the processor 11 starts the process shown in FIG. 2. First, an index i for specifying a setting item is set to "1" (Step S1), and it is determined whether or not the injection molding machine is currently operating (Step S2). If the machine is not operating, the i-th setting item on the displayed screen is shown in a first display appearance (normal form) (Step S7), then the index i is incremented by "1" (Step S5), and it is determined whether or not the index i is greater than the number N of the setting items displayed on the display screen (Step S6). If N is not exceeded, the procedure returns to Step S2.

On the other hand, if it is determined in Step S2 that the injection molding machine is in operation, it is determined whether or not the i-th setting item on the displayed screen is stored as an unalterable item (Step S3). If the i-th setting item is not an unalterable item, the procedure proceeds to Step S7 explained above; if the i-th setting item is stored as an unalterable item, the i-th setting item of the displayed screen is shown in a second display appearance different from the first display appearance (Step S4). Then, Step S5 is executed to increment the index i by "1", and it is determined whether or not the index i is greater than the number N of the setting items displayed on the screen, that is, whether or not the determination as to alterability and the selection of display appearance have been performed with respect to all setting items on the screen (Step S6). If the index i is not greater than the number N of the setting items on the screen, the procedure returns to Step S2. Steps S2 to S5 and S7 are thereafter repeatedly executed until the index i exceeds the number N of setting items, so that each time the process is executed, the i-th setting item is displayed in the first display appearance if it is alterable during the operation of the injection molding machine, and is displayed in the second display appearance on the screen if it is unalterable.

The second display appearance is made distinguishable from the first display appearance by changing the display color, size, font or brightness or adding shading, underline or a special mark.

FIG. 3 exemplifies a screen displayed according to the embodiment, or more specifically, a mold movement options screen showing the aforementioned core setting etc. As seen from the illustrated example, during operation, those setting items which are not alterable during operation (e.g., core sequence ON/OFF setting) are shown with a mark A ("-" enclosed in a circle) added thereto (second display appearance).

The setting items include those consisting of item names and set values (set details) and those consisting of set values (set details) only. In the example shown in FIG. 3, the setting item "CORE SEQUENCE" consists of an item name and a set detail, and the mark A is added to the set detail (ON) of the setting item. Alternatively, the item name (CORE SEQUENCE) may be shown in a different display appearance or both the item name and the set value (set detail) may be shown in a different display appearance so as to make it easier to determine whether the setting item is alterable or unalterable.

According to this embodiment, when the injection molding machine is not operating, all setting items displayed on the screen are shown in the first display appearance, thus permitting the operator to ascertain that the setting items are alterable. When the injection molding machine is operated, the screen changes such that the unalterable setting items are shown in the second display appearance. Thus, the appearance of those setting items which cannot be altered during the operation of the injection molding machine is dynamically changed, and this permits the operator to clearly recognize thereafter that the setting items shown in the second display appearance are not alterable during the operation of the injection molding machine.

Figure 4:
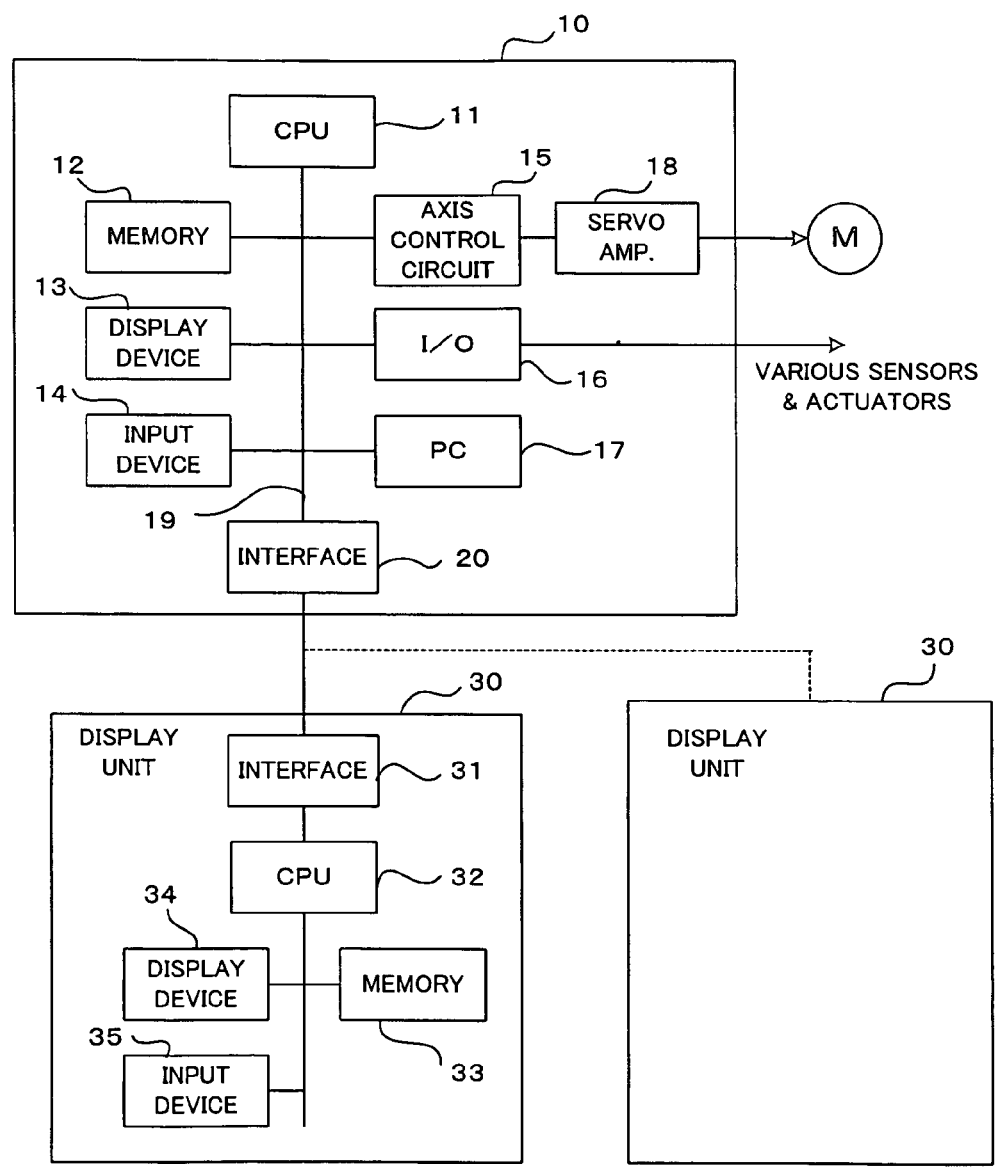
FIG. 4 is a block diagram showing a principal part of a second embodiment according to the present invention.

FIG. 4 is a block diagram showing a principal part of a second embodiment according to the present invention. In the second embodiment, the controller 10 of the injection molding machine, which constitutes the display apparatus, is equipped with an interface 20 for an external display unit so that an external display unit 30 can be connected via the interface 20. The external display unit 30 comprises an interface 31 connected to the interface 20, a processor 32, a memory 33 such as ROM and RAM, a display device 34, and an input device 35 such as a keyboard.

When a screen to be displayed is selected through the input device of the external display unit 30, the processor 32 requests, via the interfaces 31 and 20, the controller 10 of the injection molding machine to provide data necessary for displaying the selected screen. In response to the request, the controller 10 of the injection molding machine sends, to the external display unit, the requested data for displaying the screen as well as information indicating whether the injection molding machine is currently operating or not. Based on the data and information received from the controller 10 of the injection molding machine, the processor 32 of the external display unit 30 executes the display control process shown in FIG. 2, to display the screen on the display device 34 in such a manner that the display appearance of the setting items is changed depending on whether the injection molding machine is operating or not and whether the setting items are alterable during operation or not.

A plurality of external display units 30 may be connected, as indicated by the broken line in FIG. 4, so as to display setting screens or monitoring screens, as shown in FIG. 3, on their respective display devices 34.

Figure 5:
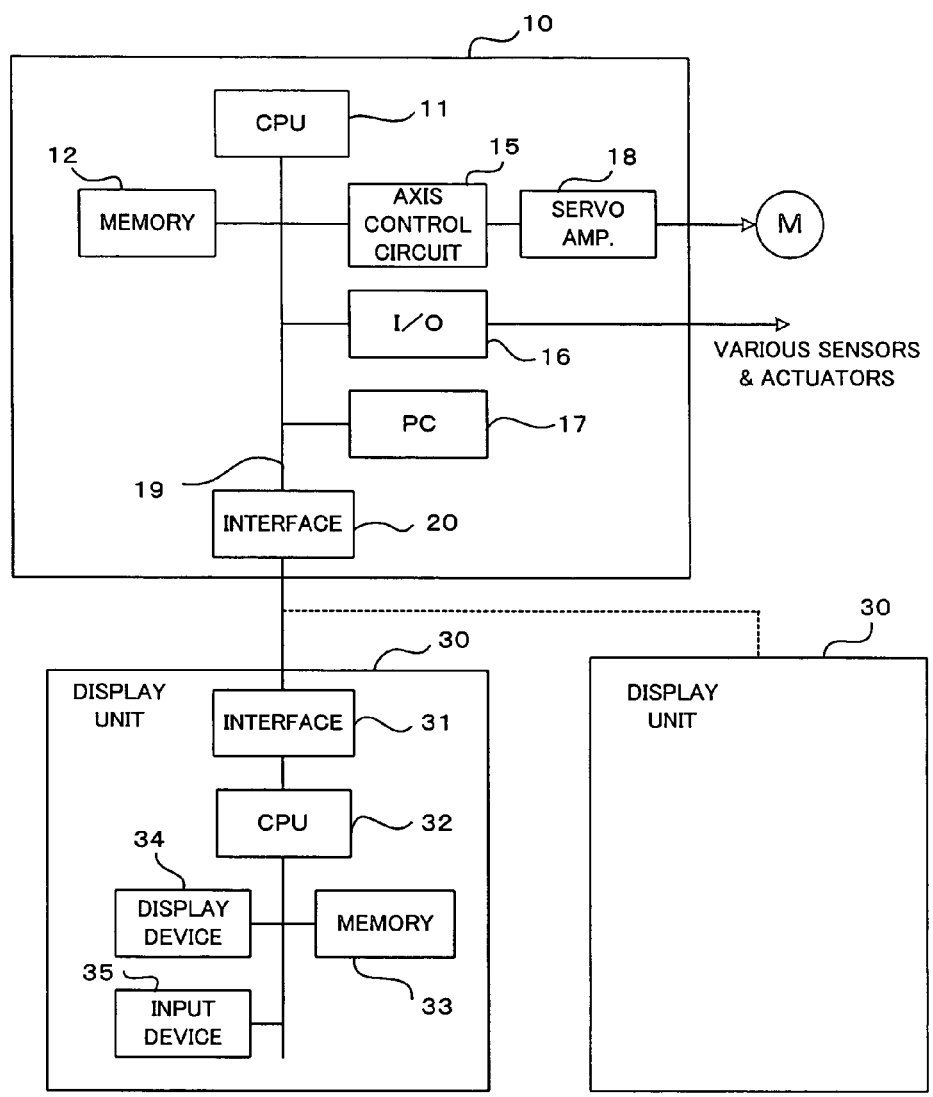
FIG. 5 is a block diagram showing a principal part of a third embodiment according to the present invention.

FIG. 5 is a block diagram showing a principal part of a third embodiment according to the present invention. The third embodiment differs from the second embodiment shown in FIG. 4 only in that the controller 10 of the injection molding machine is not provided with a display device or an input device. The operation of the third embodiment is identical with that of the second embodiment, and therefore, description thereof is omitted.

Figure 6:
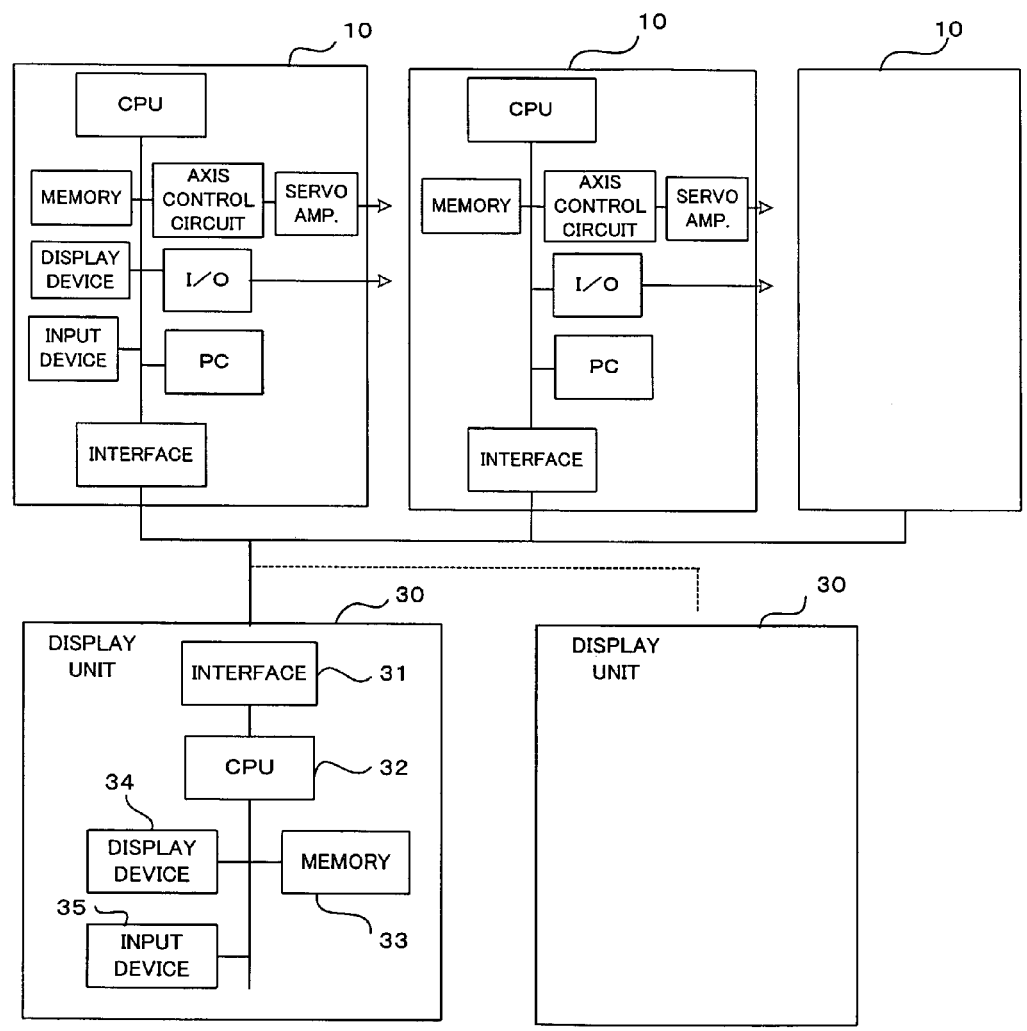
FIG. 6 is a block diagram showing a principal part of a fourth embodiment according to the present invention.

FIG. 6 is a block diagram showing a principal part of a fourth embodiment according to the present invention.

In the fourth embodiment, one or more external display units 30 are connected via interfaces to controllers 10 associated with multiple injection molding machines. The controller 10 of each injection molding machine according to the fourth embodiment may be provided with the display device 13 and the input device 14 so as to function also as the display apparatus, or may not be provided with the display device or the input device. The external display unit 30 selects a target injection molding machine via the interface and displays various screens related with the selected injection molding machine.

A target injection molding machine as well as a screen to be displayed are selected through the input device 35 of the external display unit 30, whereupon the processor 32 requests, via the interfaces 31 and 20, the controller 10 of the selected injection molding machine to provide data necessary for displaying the selected screen. In response to the request, the controller 10 of the selected injection molding machine sends, to the external display unit 30, the requested data for displaying the screen as well as information indicating whether the injection molding machine is currently operating or not. Based on the data and information received from the controller 10 of the injection molding machine, the processor 32 of the external display unit 30 executes the display control process shown in FIG. 2, to display the screen on the display device 34 in such a manner that the display appearance of the setting items is changed depending on whether the injection molding machine is operating or not and whether the setting items are alterable during operation or not.

In the foregoing embodiments, the display appearance of setting items that are unalterable during the operation of the injection molding machine is changed depending on whether the injection molding machine is operating or not. Alternatively, the display appearance may be changed in the manner described below.

The injection molding machine is operated in several modes such as automatic operation mode and manual operation mode. In cases where the setting items include those (setting items A) which should not be altered only during automatic operation, those (setting items B) which should not be altered only during manual operation, and those (setting items C) which should not be altered during both automatic operation and manual operation, the display appearance of the setting items A and C may be changed during automatic operation, and the display appearance of the setting items B and C may be changed during manual operation. Alternatively, no distinction may be made between automatic operation and manual operation and the display appearance of all of the setting items A, B and C may be changed regardless of whether the injection molding machine is operating in automatic operation mode or manual operation mode.

Settings such as the stop position for mold movement relative to the core can be sometimes alterable and at other times unalterable during operation, depending on the state in which the core is used. Thus, whether such settings are alterable during operation or not may be determined by evaluating the contents of the related setting items.

Also, the item names and set values (set details) of the setting items may be represented by using graphic symbols such as icons, and the display appearance (shape, color, size, etc.) of the graphic symbols may be changed.

What is claimed is:

1. A display apparatus for an injection molding machine in which a plurality of setting items of the injection molding machine are displayed on a display device, comprising:
   storage means for storing information on alterability/unalterability of each of the setting items in an operation of the injection molding machine;
   operation determining means for determining whether or not the injection molding machine is in operation;
   alterability/unalterability determining means for determining whether each of the setting items is alterable or unalterable during an operation of the injection molding machine based on the information on alterability/unalterability of each of the setting items;

display appearance changing means for displaying one or more setting items that are determined alterable in a first display appearance and displaying the setting items that are determined unalterable in a second display appearance different from the first display appearance on the display device when it is determined that the injection molding machine is in operation, and displaying all of the setting items in the first display appearance on the display device when it is determined that the injection molding machine is not in operation, whereby the display appearance of the setting items that are determined unalterable is changed on the display device in dependence upon operation state of the injection molding machine.

2. A display apparatus according to claim 1, wherein the setting items comprise set values or details, and the set values or details that are made unalterable are displayed in the second display appearance different from the first display appearance of the other set values or details.

3. A display apparatus according to claim 1, wherein the setting items comprise item names, and the item names that are made unalterable are displayed in the second display appearance different from the first display appearance of the other item names.

4. A display apparatus according to claim 1, wherein a controller of the injection molding machine has the display device and serves as said operation determining means, said alterability/unalterability determining means and said display appearance changing means.

5. A display apparatus according to claim 1, wherein the display apparatus constitutes an external display unit with the display device and an interface, and the external display unit is connected to a controller of the injection molding machine through the interface.

6. A display apparatus according to claim 1, wherein the display apparatus constitutes an external display unit with the display device and an interface, and the external display unit is connected to controllers of a plurality of injection molding machines through the interface, to display the plurality of setting items for any of the plurality of injection molding machines on the display device.

* * * * *